United States Patent [19]

Chang et al.

[11] Patent Number: 5,362,582

[45] Date of Patent: * Nov. 8, 1994

[54] BATTERY SEPARATOR

[75] Inventors: Victor S. Chang, Ellicott City; Richard C. Hartwig, Laurel, both of Md.; Joseph T. Lundquist, Gilroy, Calif.; Marc E. Parham, Bedford, Mass.; James K. Kung, Lexington, Mass.; James A. Avtges, Belmont, Mass.; Anthony J. Laccetti, North Andover, Mass.

[73] Assignee: W.R. Grace & Co.-Conn., New York, N.Y.

[ * ] Notice: The portion of the term of this patent subsequent to Sep. 13, 2011 has been disclaimed.

[21] Appl. No.: 41,747

[22] Filed: Apr. 1, 1993

[51] Int. Cl.⁵ ............................................. H01M 2/14
[52] U.S. Cl. .................... 429/249; 429/251; 429/254; 429/129; 429/131; 429/142
[58] Field of Search ............... 429/129, 131, 142, 145, 429/249, 251, 254

[56] References Cited

U.S. PATENT DOCUMENTS

| | | |
|---|---|---|
| 2,953,622 | 9/1960 | Gray . |
| 3,036,148 | 5/1962 | Fisher et al. . |
| 3,377,495 | 11/1967 | Larsen et al. . |
| 3,419,430 | 12/1968 | Michaels . |
| 3,419,431 | 12/1968 | Michaels . |
| 3,450,650 | 6/1969 | Murata . |
| 3,632,404 | 1/1972 | Dessuminiers et al. . |
| 3,651,030 | 3/1972 | Desumminiers et al. . |
| 3,696,061 | 10/1972 | Selsor et al. . |
| 3,707,434 | 12/1972 | Strayer . |
| 3,709,841 | 1/1973 | Quentin . |
| 3,749,604 | 7/1973 | Langer et al. . |
| 3,766,106 | 10/1973 | Yurimota et al. . |
| 3,855,122 | 12/1974 | Bourganel . |
| 3,900,341 | 8/1975 | Schoichiro et al. . |
| 3,933,561 | 1/1976 | Larson et al. . |
| 3,997,366 | 12/1976 | Davis . |
| 4,008,203 | 2/1977 | Jones et al. . |
| 4,072,802 | 2/1978 | Marata et al. . |
| 4,078,123 | 3/1978 | Costenoble . |
| 4,098,930 | 7/1978 | Nakayama et al. . |
| 4,153,760 | 5/1979 | Sundberg et al. . |
| 4,201,838 | 5/1980 | Goldberg . |
| 4,210,998 | 7/1980 | Gaunt . |
| 4,221,846 | 9/1980 | Armstrong et al. . |
| 4,243,562 | 1/1981 | Petit . |
| 4,273,903 | 6/1981 | Rose . |
| 4,286,015 | 8/1981 | Yoshida et al. . |
| 4,287,276 | 9/1981 | Lundquist et al. . |
| 4,288,503 | 9/1981 | Goldberg . |
| 4,351,860 | 9/1982 | Yoshida et al. . |
| 4,481,260 | 11/1984 | Nohmi . |
| 4,496,623 | 1/1985 | Fraige . |
| 4,529,646 | 7/1985 | Sundet . |
| 4,618,545 | 10/1986 | Clegg et al. . |
| 4,650,730 | 3/1987 | Lundquist et al. ............. 429/62 |
| 4,681,750 | 7/1987 | Johnson et al. . |
| 4,699,857 | 10/1987 | Giovannoni et al. . |
| 4,714,663 | 12/1987 | Arnold et al. . |
| 4,721,568 | 1/1988 | Henrious . |
| 4,755,299 | 7/1988 | Brüschke . |
| 4,776,999 | 10/1988 | Kohn . |

FOREIGN PATENT DOCUMENTS

| | | |
|---|---|---|
| 4959167 | 10/1972 | Japan . |
| 565022 | 10/1942 | United Kingdom . |
| 1107782 | 3/1968 | United Kingdom . |

Primary Examiner—Prince Willis, Jr.
Assistant Examiner—M. Nuzzolillo
Attorney, Agent, or Firm—Howard J. Troffkin

[57] ABSTRACT

A battery separator composed of a microporous sheet product having first and second major surfaces and a thickness of less than about 50 mils, formed from a uniform mixture of a polymer and a filler or a polymer and a structure enhancing agent and having a porous sheet embedded between the first and second major surface. The porosity of the sheet product is at least about 50 volume percent having a pore distribution such that the nominal pore diameter increases from each major surface towards the interior central portion of the sheet product's thickness.

13 Claims, No Drawings

BATTERY SEPARATOR

BACKGROUND OF THE INVENTION

The subject invention is directed to a sheet product which is useful as separator components for batteries and to improved batteries containing the formed separator. More specifically, the present invention is directed to a thin microporous sheet product composed of a highly filled polymeric matrix or a low level filled (including unfilled) polymeric matrix having a porous support sheet embedded between the sheet products first and second major surfaces and having an average pore size distribution across the thickness of the sheet product such that there is a gradient of nominal pore size increasing from each major surface towards the central, interior portion of the sheet product's thickness.

Membranes have been formed from various materials and used in various applications such as in ion exchange, osmotic and ultra filtration devices including desalinazation, kidney dialysis, gas separation and other applications. Macro and microporous membranes have been used as a means of insulating and separating electrodes in battery devices. Each application provides an environment and a set of desired parameters which are distinct to the specific application.

Storage batteries have at least one pair of electrodes of opposite polarity and, in general, have series of adjacent electrodes of alternating polarity. The current flow between these electrodes is maintained by an electrolyte which may be acidic, alkaline, or substantially neutral depending upon the nature of the battery system. Separators are located in batteries between adjacent electrodes of opposite polarity to prevent direct contact between the oppositely charged electrode plates while freely permitting electrolytic conduction. Separator components have taken many forms. In a modern battery design, the separator is in the form of a thin sheet or film or more preferably, a thin envelope surrounding each electrode plate of one polarity.

It is generally agreed that one of the critical elements in a battery design is the separator component and, to be highly effective in the design, the separator should have a combination of features. The battery separator must be resistant to degradation and instability with respect to the battery environment, including the other battery components and the battery chemistry. Thus, the battery separator must be capable of withstanding degradation of strong acids (such as sulfuric acid commonly used in acid battery designs) or strong alkali (such as potassium hydroxide used in alkaline battery designs) and to do so under ambient and elevated temperature conditions. Further, the separator should also be of a thin and highly porous character to provide a battery of high energy density. Although battery separators of thick or heavy design have been utilized in the past, such materials detract from the overall energy density of the battery by reducing the amount of electrodes that can be contained in a predetermined battery configuration and size. Another criteria is that the battery separator must be capable of allowing a high degree of electrolytic conductivity. Stated another way an effective separator membrane must exhibit a low electrical resistance when in the battery. The lower the electrical resistance the better the overall battery performance will be. A still further criteria is that the separator should be capable of inhibiting formation and growth of dendrites. Such dendrite formation occurs during battery operation when part of the electrode material becomes dissolved in the electrolyte and, while passing through the separator, deposits therein to develop a formation which can, after a period of time, bridge the thickness of the separator membrane and cause shorting between electrodes of opposite polarity.

In addition to meeting the above combination of properties, it is highly desired to have a sheet product which is capable of exhibiting good physical properties of tensile strength, flexibility and ductility to withstand the handling and processing without developing imperfections and cracks which would cause the sheet product to be unsuitable as a battery separator. Meeting this criteria is contrary to some of the above described properties (i.e. thin and light weight material and high porosity to provide good conductivity). In providing envelope type separators, these physical properties must also be accompanied by the ability of the material to be sealable by heat, or other means so as to provide a pocket design.

Various microporous membranes or sheet materials have been suggested for utilization as a battery separator. Separators conventionally used in present battery systems are formed of polymeric films which when placed in an electrolyte or an electrolyte system, are capable of exhibiting a high degree of conductivity while being stable to the environment presented by the battery system. The films include macroporous as well as microporous materials. The porosity permits transportation of the electrolyte. Examples of such separators include polyolefin sheets which have been stretched and annealed to provide microporosity to the sheet, such as is described in U.S. Pat. Nos. 3,558,764; 3,679,538; and 3,853,601. In addition, other separators which include filler materials are disclosed in U.S. Pat. Nos. 3,351,495 and 4,024,323. These separators exhibit electrical resistance which does not permit the formation of a highly efficient, high energy battery system.

It is highly desired to have a battery separator which is capable of exhibiting very low electrical resistance while at the same time providing the combination of properties described above.

SUMMARY OF THE INVENTION

The present invention is directed to a sheet product, battery separators formed therefrom and to improved batteries which incorporate the thus formed battery separator. The subject separator comprises a microporous sheet product composed of a substantially uniform mixture of polymer and filler and/or with a carboxylic acid or sulfonic acid polymer salt; said sheet product has a porous sheet embedded therein and has a pore structure throughout the thickness such that the nominal pore diameter of pores increases incrementally from each major surface to the interior, central section of the sheet product's thickness.

DETAILED DESCRIPTION

The present invention provides a flexible sheet material having high void volume, porosity of a microporous nature and of a configuration which substantially inhibits dendrite formation. The subject sheet material has high tensile strength and ductility sufficient to withstand handling during battery formation, is capable of being formed into desired shapes for use in a battery, is capable of exhibiting a high degree of stability to battery environment over sustained periods of time and of allowing a high degree of electrical conductivity (low electrical resistance). Still further, the subject sheet material has the ability to maintain its integrity and performance characteristics while being able to be formed into a pocket design separator.

The sheet product of the present invention should be in the form of a very thin sheet of less than 50 mils, and preferably less than 10 mils in thickness. The thin sheet is bound by two major surfaces with a thickness therebetween. The body making up the thickness is composed of a substantially uniform composition formed from a polymer with particulate filler and/or with a carboxylic acid or sulfonic acid polymer salt, each of which is fully described hereinbelow. The body, in addition, contains therein a porous support sheet extending the length and breadth of the present sheet product and substantially contained between the present sheet products two major surfaces.

For purposes of clarity, certain terms used in the present description and in the appended claims have the following meanings:

A "sheet" is intended to define a unitary article having a large surface and is used herein to refer to a scrim or woven, non-woven or knit porous material used as a component of the subject separator.

A "battery" refers to a single electrochemical cell or, alternately, a multiple of electrochemical cells which are designed to operate in coordination with each other.

A "separator" is a component of a battery which provides a means of separation between adjacent electrode plates or members of opposite polarity. The separator of the present invention may have various configurations, such as a flat, embossed or ribbed material in the form of a membrane or an envelope design capable of maintaining separation between electrodes.

A "sheet product" is intended to define a composite product of the present invention which is microporous, has pore size distribution across the thickness such that there is a gradient of nominal pore size which increases from each major surface of the sheet product towards its central, interior portion, has a porous support sheet substantially contained within the sheet product's thickness and has a form of a polymer-filler composite or a polymer/(surfacant/viscosifer) composite with or without filler. The sheet product can be used to form separators suitable as a battery component.

The term "polycarboxylic acid polymer salt" is intended to define a hydrocarbon polymer having a multiplicity of aliphatic carboxylic acid units pendent from the polymer chain with at least a portion of said acid units in the form of a salt.

The term "polyacrylic acid polymer salt" is intended to define a polycarboxylic acid polymer salt having a multiplicity of unsaturated aliphatic carboxylic acid units of the general formula $C_nH_{2n-2}O_2$ such as acrylic acid ($C_2H_3COOH$), crotonic acid, vinyl acetic acid as well as ($C_1$-$C_3$ alk)acrylic acid such as methacrylic acid and the like and copolymers of said acids or with other non-acid comonomer, such as acrylonitrile, alkylenes, acrylic acid esters, alkacrylic acid esters, polyalkenyl ether and the like. At least a portion of the acid groups are in salt form.

The term "polysulfonic acid polymer salt" is intended to define a hydrocarbon polymer having a plurality of aliphatic or aromatic sulfonic acid or sulfonyl chloride units pendent from the polymer chain and at least a portion of the acid groups are in salt form.

The polymer used to form the body of the sheet product of the present invention can be selected from polymers which are stable with respect to a battery environment for which the sheet product will be used. That is to say, the polymer must be free of chemical groups which are subject to being attacked and decomposed by the components making up the battery environment. For example, the polymer must be stable to strong acid when contemplated for use in an acid battery (i.e. lead-acid battery) or to strong alkaline environment when contemplated for use in an alkaline battery (i.e. nickel-zinc using aq. KOH, as electrolyte). Examples of polymers stable to acid environment include polyolefins (polyethylene, polypropylene); halogenated polyolefins (polyvinyl chloride, polyvinyl fluoride, polyvinylidene chloride and polyvinydene fluoride); polyphenylene oxide; polyphenylene sulfide; polyethylene-acrylic acid copolymers; polystyrene; polyacrylonitrile; polycarbonate; polymers (polyarylether sulfones) as well as their copolymers and mixtures thereof. Examples of polymers stable to alkaline environment include polyolefins, (polyethylene, polypropylene), polyamines, polyurethanes, polyethylenimines, polyvinyl alcohols, cellulosic materials as well as their copolymers and mixtures thereof.

The subject vinylidene difluoride polymers which are composed of monomeric units described above and the resultant polymer products should be soluble in a first liquid and insoluble in a second liquid, as described ully herein below. The vinylidene difluoride polymers should be selected from high molecular weight polymers having a weight average molecular weight of at least about 250,000, preferably from about 250,0–00 to about 500,000. Higher molecular weight polymer can be used as needed to increase the tensile properties of the resultant sheet. Alternatively, the polymers may include lower weight average molecular weight polymers of from about 100,00 to about 200,000 which are capable of contributing the desired viscosity to an initially formed dope composition. In certain instances, when a lower molecular weight polymer product is used, the dope composition may further contain known agents capable of causing vulcanization of the vinuylidene difluoride polymers at temperatures to which the formed sheet product is subjected during or subsequent to formation. Such volcanizing agents are well known and include, for example benzoquinones or 1,4-naphthoquinones in combination with usual benzoquinones or 1,4-naphthoquinones in combination with usual additives, as discussed in U.S. Pat. No. 3,872,065 to Schmiegel, which teaching is incorporated by reference.

The polymers should have solubility characteristics such that the polymer is soluble in a first liquid while being substantially insoluble in a second liquid (including mixtures of minor amounts of first liquid and major amounts of second liquid) and wherein the first and second liquids are miscible to a high degree with one another. The polymer should be soluble in the first liquid in at least about 2 wt. percent, preferably from about 10 to 30 wt. percent. High solubility within the first liquid is preferred. The first liquid to be used will depend upon the polymer of choice and the availability of a second miscible liquid. For example, when polyolefin is the polymer of choice, the first liquid can be a higher molecular weight hydrocarbon, such as a light petrolium oil, vegetable oil and the like which is capable of forming a fluid polymer/filler mixture at elevated temperatures (i.e. 100° C.) and, in such instance, the second liquid can be a halogenated hydrocarbon (i.e. carbon tetrachloride, methylene chloride), hydrocarbon solvents (i.e. hexane, toluene, cyclohexane) and the like. When the polymer is chosen from polymeric materials having polar or functional groups, such as polyalcohols, polycarbonates, polymers, polyvinyl halides, polyurethanes, the first liquid can be a polar organic liquid, such as N-methylpyrrolidone, dimethylformamide, diethylformamide, dimethylacetamide and the like or a halogenated hydrocarbon such as dichloroethane, trichloroethane, tetrachloroethane trichloropropane and the like. Liquids having low rates of vaporization are preferred. The second liquid in such instances can be chosen from water, or organic liquids which are miscible with the first liquid and incapable of dissolving the polymer. Such liquids include methanol, ethanol, ethylene glycol, glycerol, ethers, glyme and the like. Water is the preferred second liquid. Each liquid (first and second) can be used alone or as a mixture provided the resultant mixture meets the solubility criteria described hereinabove. Normally, the second liquid is used alone and may contain minor amounts (up to about 40%) of first liquid as the total weight of solution.

The filler to be used in forming the polymer/filler/first liquid mixture, described above and the resultant polymer/filler matrix of the sheet product of this invention should be a particulate material having high surface area (BET; about 20 to 950 $m^2/gm$, preferably at least 100 $m^2/gm$), high pore volume (BET; at least about 0.2 cc/gm; preferably at least about 1 cc/gm). The size of the ultimate (non-agglomerated) filler particulate material should be very small having an average diameter of from about 0.01 to about 75 microns. The low end of the particle size range refers to single particles while the high end may include agglomerated material, for particles which exhibit such tendency. The particle size is preferably from about 0.01 to about 50 microns). The filler should be substantially free of large (greater than 100 microns) diameter particulate material (ultimate or agglomerate material). The filler must be inert with respect to the battery environment and must be substantially insoluble with respect to the first and second liquids when used in forming the subject sheet product, as fully described hereinbelow.

The particulate material used as filler component of the subject sheet product can be selected from a variety of materials such as metal oxides and hydroxides, as, for example, oxides and hydroxides of silicon, aluminum, calcium, magnesium, barium, titanium, zirconium, cerium, iron, zinc and tin; metal carbonates as, for example, carbonates of calcium and magnesium; minerals as, for example, mica, vermiculite, montmorillonite, kaolite, attapulgite, talc, and diatomaceous earth; synthetic and natural zeolites; silicates as, for example, calcium silicate, aluminum polysilicates, alumina, and silica gels; cellulosic materials as, for example, wood flours, wood fibers, and bark products; and glass particles as, for example microbeads, hollow microspheres, flakes and fibers. Carbonaceous material as, for example, carbon black, acetylene black, coal dust, and graphite may be used in small amounts in combination with the other particulate material.

As stated above, the filler must be selected with respect to the battery environment with which the subject separator is intended for use. That is to say the particulate filler must be inert with respect to such end use battery environment. Therefore, alkali insoluble particulate such as zirconia and titanium dioxide (preferred), oxides, hydroxides and carbonates of calcium, magnesium, iron, rare earth and the like should be used only in sheet products which ultimately are formed into battery separators for alkaline batteries. Similarly, acid insoluble particulates such as silica (a precipitated silica is preferred), and the like should be used only in sheet products which ultimately are formed into battery separators for acid batteries. Certain particulates can be used in either acid, alkaline or neutral battery systems and include carbon, coal dust, graphite and barium sulfate. Particulate materials which are inert to a battery system can be mixed to form the total filler content used in the sheet product.

The sheet product of the present invention has a porous support sheet contained within the thickness of the sheet product. The sheet can be in the form of a scrim, a woven or non-woven fabric or a knit material and can be formed from a continuous or non-continuous fibrous material. The material used to form the sheet component of the sheet product must be a material which is inert to the battery environment. Although the sheet component is contained in the interior of the sheet product's thickness, it is contacted with electrolyte solution (including cathodic and anodic material in the solution) as the solution passes through and is contained in the separator. Thus, the material can be, for example, selected from glass, polyolefin, polyester or polyacrylonitrile polymer filaments or mixtures or copolymers formed with other stable monomeric units (i.e. polyacrylonitrile/polyacrylic acid copolymer; polyolefin/polyacrylic acid copolymer) when the sheet product is used to form a separator for battery utility. Sheets formed from polyamides and the like are suitable to form sheet products used to form separators for alkaline battery application. The sheet may be planar (that is, have substantially planar major surfaces) or patterned (that is, have patterned elevated and depressed sections of the major surfaces. It is preferable to utilize a planar sheet to assure that the sheet is contained within the body (or thickness) of the sheet product. The sheet is preferably formed from a substantially uniform, thin denier thread (denier of from about 0.02 to 10) to also assure that the sheet is contained within the body of the sheet product. The sheet should have a tensile strength of at least 5 p.l.i. The particular thickness of the sheet should be less than about 0.8 (preferably less than about 0.6) of the thickness of the sheet product. The sheet should extend for substantially the full length and breadth of the resultant sheet product.

The sheet product of the present invention can be formed by various means. Generally, the polymer and particulate material are mixed together with the first liquid to provide a substantially uniform polymer/filler/first liquid composition. The first liquid being a liquid in which the polymer is soluble when in concentrations of from about 5–30% wt. % (preferably 10–20%). The polymer may be present in from about 5–30 (preferably 10–20) wt. percent and the filler may be present in from about 5–40 (preferably 10–20) wt percent of the total composition. In a preferred embodiment, 1 part by wt. polymer, 1 part by wt. filler and 8 parts by wt. first liquid are used to form a dope composition. The amount of polymer and filler used in the composition should be such that their ratio is substantially the ratio of polymer/filler required in the resultant sheet product. Normally this is 1:4 to 4:1 and preferably 1:1.5 to 1.5:1. The amount of first liquid used to make the composition must be sufficient to provide a composition having a viscosity of about from 100 to about 10,000 cps (Brookfield viscometer at 12 rpm) preferably from about 500 to 8000 cps to be sufficiently viscous to have "body" when combined with the sheet, as described below. To enhance or attain the desired viscosity, one can add effective amounts of a viscosifier agent provided such agent is either inert to the battery environment or is soluble in the second liquid to be removed along with the first liquid component of the dope.

Another embodiment of the present invention provides a battery separator having low content (0 up to about 20 weight percent, preferably from 0 up to about 10 weight percent) of particulate filler, as described hereinabove. When low filler content is desired, it has been unexpectedly found that the filler can be removed provided the polymer component is composed of a major portion of a polymer with a minor portion of a structure enhancing agent. When such low-filler content sheet product is formed, the resultant separator is capable of maintaining its high void volume, exhibits very low electrical resistance when in the battery system (in comparison to sheet product void of structure enhancing) agent and exhibits high tensile strength.

The structure enhancing agent useful in the present invention when low-level filler separator is desired should be capable of exhibiting a combination of properties with respect to the particular polymer/first liquid and with respect to the resultant sheet product. Firstly, the agent should be capable of increasing the viscosity of the polymer/first liquid by a factor of at least about 5 fold and preferably at least about 10 fold. Thus, a polymer/first liquid having a viscosity of about 50 cps will have a viscosity of at least about 250 cps, preferably 500 cps (Brookfield, #4, 50 rpm) when the agent is made part of the dope composition. Secondly, the agent should be substantially insoluble in the second liquid or capable of being at least partially retained (such as a polymer alloy) in the sheet product after subjection to second liquid. Thirdly, the agent must be, similar to the polymer, stable with respect to the battery system contemplated for its use. Fourthly, the agent should aid in enhancing the pore volume of the resultant sheet product vis-a-vis sheet products formed from polymer without the agent. Fifth, the agent should be capable of imparting enhanced (i.e. lower) electrical resistance properties to the resultant separator (compared to sheet product without agent).

The formed separator unexpectedly exhibits the combined properties of high void volume, low electrical resistance, good physical strength and stability over extended periods of time, as required for a superior battery system. The separator is composed of a polymeric component formed of a mixture of a polyarylether sulfone and from about 0.1 to 15 weight percent (preferably about 1.5 to 10 wt. percent) based on the total weight of the polymer component of a viscosifer/surfacant agent as, for example, a salt polycarboxylic acid polymer salt or a polymer acid polymer salt based on the total polymer content. In addition to the polymer/agent mixture, the sheet product may contain low-levels of particulate fille as, for example, of from 0 to about 20 weight percent, preferably from about 0 to 10 weight percent. The initially formed dope composition should contain the polymer and the agent (and, where desired, filler) in ratios appropriate to attain the above composition when the first liquid of the dope is removed. The amount of polymer contained in the dope may be from about 5 to 30 (preferably 10-20) weight percent with the agent and, if used, filler being in amounts dictated by the desired composition of the resultant sheet product and by the required dope viscosity, as described below.

The preferred structure enhancing agents for the polymer are polycarboxylic acid polymer salts or polysulfonic acid polymer salts, as described herein below (each referred to herein as "second polymer").

The polycarboxylic acid polymer salt can be formed from any polymeric hydrocarbon having aliphatic carboxylic acid groups pendent from the polymer's backbone chain. The preferred polycarboxylic acid polymers are polyacrylic acids, poly ($C_1$–$C_5$ alk)acrylic acids, copolymers of acrylic acids and alkacrylic acids as well as polymers and copolymers of said materials with other monomeric units such as acrylonitrile, an alkylene (e.g. butadiene, isoprene, ethylene, and the like). Preferred polymers are polyacrylic acid or polymethacrylic acid homopolymers or those which have only small amounts (e.g. less than 10%) of copolymer units. The most preferred polymers are acrylic acid polymers of high molecular weight which are cross-linked with a polyalkenylpolyether. (Sold under the trademark "Carbopol").

The polysulfonic acid polymer salts can be selected from any polymeric hydrocarbon having aliphatic free sulfonic acid groups or aliphatic sulfonyl chloride groups pendent from the polymer's backbone chain. Such polymers include for example, polyvinylsulfonic acid, polychlorovinyl sulfonyl chloride (sold under the trademark "Hypolon") and the like.

The polymer acids used to form the salts should be of a high weight average molecular weight of at least about 250,000. It is preferred that the polymer be of a molecular weight of from about 400,000 to about 5,000,000 and most preferably of from about 1,000,000 to 5,000,000. These polymers (as the salt) should be miscible with and swelling in the first liquid while being substantially insoluble or at least retainable therein as a polymer alloy with the main polymer described above in the second liquid used in forming the subject separator. The particular liquids and polymer used in forming the separator will dictate the composition of the agent or second polymer to be used. The solubility characteristics of the second polymer can be readily determined by one skilled in the art by conventional techniques. The agent to be used for swelling and viscosity increase is determined by matching solubility, hydrogen bonding and dipole moment of the first liquid and polymer blend.

The second polymer should be at least partially neutralized by forming a salt of the carboxylic acid or sulfonic acid units. Such neutralization may be attained with from about 0.1 to 1.01, preferably from about 0.25 to 1 molar ratio of an inorganic base, such as an alkali or alkaline earth metal oxide or hydroxide when the resultant separator is contemplated for use in an alkaline battery system. In the case of acid battery separators, it has been unexpectedly found that a base in the form of organic amines, in particular secondary and tertiary amines, can be used to form the polycarboxylic acid polymer salt and the polysulfonic acid polymer salt to be included in the battery separator product and that such product is stable in and not detrimental to the battery environment. The amine can be selected from dialkyl and trialkyl amines wherein each alkyl is independently selected from a $C_2$ to $C_{20}$ alkyl group or a $C_2$–$C_{10}$ hydroxyalkyl group (preferably a higher alkyl such as a $C_6$–$C_{20}$ alkyl or a $C_3$–$C_8$ hydroxyalkyl) such as diamylamine, triamylamine, triisopropylamine, diisopropanolamine, dihexylamine, di(2-ethylhexyl) amine. For example, a polymer dope formed with dimethylformamide, N-methylpyrrolidone, diethylene glycol or dimethyl sulfoxide as the first liquid may contain a high molecular weight polyacrylic acid which is at least partially neutralized with diisopropanolamine, triethylamine, di(2-ethylhexyl)amine (preferred) and the like to provide a high viscosity dope.

The polymer/filler/first liquid or polymer/agent-/first liquid composition can be impregnated into the sheet in a manner which causes the composition to be uniformly distributed throughout the thickness of the sheet and to extend on each side thereof to form a coating of dope composition on each surface of the sheet. This can be done by various techniques such as dipping, coating, and the like. It is preferable to impregnate and coat the sheet by applying the dope composition onto one major surface of the sheet and forcing the dope through the sheet while maintaining the other major surface free. As the dope penetrates through the sheet in this manner, the air in the sheet's voids is forced to exit via the free surface and the free surface subsequently attains saturation and a coating of the composition. The dope may be applied in more than one application, such as by first applying a low viscosity (e.g. 400 to 1000 cps with #4 spindle at 50 rpm) dope and subsequently applying to at least one surface a higher viscosity dope. The resultant impregnated sheet should be free of air voids and bubbles.

The impregnated sheet is then contacted with the second liquid, as described above, to coagulate and solidify the polymeric component with its filler, where appropriate, while simultaneously removing the first liquid from the fibrous sheet composite. The second liquid should contact both surfaces of the previously impregnated support sheet in a manner which provides for substantially equal and concurrent rates of removal of the first liquid from the impregnated sheet. The second liquid should not contain first liquid in high concentration. It has been found that the formed sheet product of the present invention has porosity composed of pores such that there is a gradient of nominal pore size (the pore size with respect to any specific increment of thickness) increasing from each major surface of the sheet product towards the interior, central portion of its thickness. Generally, the pores exhibit a progressive and substantially continuous increase in pore diameter from each major surface towards the central section without having a major change occur at the region adjacent each major surface (the portion of the sheet products thickness which is immediately adjacent to a major surface and includes the surface, per se, as well). In addition, the sheet product of the present invention preferably has a substantially uniform void volume profile across its thickness.

In the preferred embodiment, the support sheet should be impregnated with the liquid dope composition by applying the dope onto one major surface of the support sheet and forcing it through the sheet while maintaining the other major surface free. As stated above, a second application of dope composition (preferably of higher viscosity) may be applied to one or both surfaces. This mode of application is preferred when applying a low filler content dope composition. The impregnated sheet may then be processed through a means for regulating its thickness such as by using doctor blades or the like and subsequently immersed into a bath of second liquid in a manner which substantially simultaneously contacts each of the major surfaces of the impregnated sheet to second liquid. The second liquid should not be allowed to accumulate in high concentrations in the first liquid. The concentration of first liquid should be as low as possible and less than 40%, preferably less than 30% of the total liquid. Although it is common practice to use a support member in forming membranes, it has been found that all of these steps should be done without the aid of a support member. After the impregnated sheet is contacted with the second liquid and the first liquid has been at least partially extracted, the resultant sheet product may be brought in contact with rollers and the like. The resultant sheet product should be washed with fresh amounts of second liquid to cause removal of substantially all of the first liquid. For example, when the first liquid is selected from an organic solvent, such as N-methyl pyrrolidone, the first solvent should be substantially completely removed.

The resultant sheet product is a microporous sheet of very high porosity (porosity of 50 vol. percent and even up to 80 vol. percent). The sheet product has a length and breadth and a predetermined thickness which should be less than about 50 mils, and preferably less than about 10 mils. Very thin, flexible sheet products having good mechanical properties of tensile strength and ductility have been unexpectedly formed.

The resultant sheet product is a material where the porosity is composed of pores such that there is a gradient of average pore size from each major surface toward the interior, central portion of the sheet product's thickness. The average pore size in the region adjacent to each major surface is less than about 3 microns, preferably less than about 2 microns and most preferably less than about 1 micron. The interior region of the sheet product contains pores having an average pore size greater than that of the surface region (normally at least about 1.5 times). The overall pore size may range from 0.01 to about 10 microns. These measurements can be made by scanning electron microscopy and analysis thereof and may be confirmed by mercury intrusion method.

The resultant sheet product is composed of a polymer matrix of substantially a uniform composition. In the case of the highly filled embodiment the filler is substantially uniformly dispersed in the polymer and the polymer/filler weight ratio is from 4:1 to 1:4 and, preferably from 1:1.5 to 1.5:1. The low-level filler sheet product will have a polymer matrix composition composed of from 65 to 99.9 (80 to 98.5 preferred) parts by wt. polymer; from about 0.1 to 15 (1.5 to 10 preferred) parts by weight agent or second polymer; and from 0 to 20 (0 to about 10 preferred) parts by wt. filler. Further, when the sheet product is formed by a dual application, as described above and the second application is applied to one side only, the sheet may be assymetrically contained within the sheet product's thickness and a minor portion of the sheet's fleece may extend to the surface or beyond. This provides a highly effective anchor means to attach subsequently applied rib material to that surface of the sheet product (commonly used in acid batteries).

The sheet product may contain additional components such as viscosifiers, surfactants, antioxidants, colorants and the like. Such materials can be incorporated in the sheet product by having them made part of the polymer/filler/first liquid composition, as one of the final washes of the second liquid or separately applied by spraying and the like.

In certain instances, especially where the polymeric component is a polyarylether sulfone, it is desirable to use a polymeric mixture which contains small amounts (0.1 to 10, preferably 1–7 wt. percent based on the polymer mix) of a polyacrylic acid (preferable) or poly $C_1$–$C_3$ alkacrylic acid (e.g. polymethacrylic acid). The inclusion of small amounts of these materials has been shown to enhance the flexibility of the resultant sheet product.

The sheet product is a flexible material capable of being folded upon itself and formed into an envelope design when the polymer used is thermoplastic. The initially formed sheet product may have a wrinkled configuration (especially when subjected to a free standing coagulation process). These wrinkles are readily removed by subjecting the sheet product to a heated roller or rollers while maintaining the sheet product under tension. The temperature of the heated rollers should be below the glass transition temperature of the particular polymer used (preferably at least about 25° C. below).

The sheet product can be cut into suitable shape to be used as a separator between electrodes of a battery design. The separator must extend the full length and width of the electrode to prevent electrodes of opposite polarity from contacting one another. In certain instances, it is preferred that the separator be void of patterns or other raised sections (generally for alkaline batteries) or may contain raised portions, such as ribs, buttons and the like (generally for acid batteries). The ribs or other raised portions can be formed from any polymeric material capable of adhering to the polymer used to form the base sheet product.

The following examples are given for illustrative purposes only and are not meant to be a limitation on the subject invention, as defined by the appended claims. All parts and percentages are by weight unless otherwise indicated. The electrical resistance was measured and given below in Table I. The electrical resistance of each sheet product was determined by the direct current method as described by J. J. Lander and R. D. Weaver in Characteristics of Separators for Alkaline Silver Oxide-Zinc Secondary Batteries: Screening Methods, ed by J. Cooper and A. Fleischer, Chapter 6 modified by using 35% $H_2SO_4$ as the electrolyte, $Hg/Hg_2SO_4$ type reference electrodes, and Pt screens as the current carrying electrodes. The voltage drop across the reference electrodes was measured at 20 ma.

EXAMPLE I

A solution was prepared by mixing 4.7 parts of a polyarylether sulfone formed from Bisphenol-A and dichlorodiphenyl sulfone (Amaco, Udel P-1835), 4.7 parts precipitated silica (Davison, Sylox-2), 0.06 part 2,2-diethyldihexylamine, 0.15 part polyacrylic acid and 48.9 parts N-methylpyrrolidone using a high shear mixer (Myers). The solution had a viscosity of $8.93 \times 10^3$ cps (Brookfield viscometer with #3 spindle at 12 rpm).

A series of products were formed as follows: A 0.5 oz/yd$^2$ nonwoven polyester fabric was saturated with the solution by passing the fabric over one roller of a pair of reverse kiss rollers to which the solution was introduced. The solution was thus forced through the fabric with removal of air and resulted in a saturated material having excess solution on both major surfaces. The saturated fabric was then caused to travel in a substantially vertical direction while passing through a set of gapping bars to provide a saturated material of about 7 to about 11 mils thick. The material then entered a first aqueous bath and remained therein for the time indicated below to allow solidification of the polymer and extraction of a portion of the organics. The material was then subjected to a second aqueous bath composed of fresh D.I. water at 50° C. for further removal of organics. The formed material was air dried at 60° C. for 3 min. The material was analyzed for residual organic (NMP) by dissolving a sample in THF and analyzing using gas phase chromatography. The morphology was analyzed using scanning electron microscopy (SEM). The nominal void volume was substantially equal throughout the thickness. The total void volume was determined by difference between the weight of dried sample and after saturation with isopropanol.

EXAMPLE II

A separator product was formed in the same manner as described in Example I, above, except that the polymer/filler solution was formed from 48 parts polyarylether sulfone (Udel), 48 parts talc, 0.5 part DEDHA, 1.5 parts polyacrylic acid and 504 parts N-methylpyrrolidone. The solution had a viscosity of $2.02 \times 10^3$ cps (Brookfield, #3 spindle, 12 rpm). The nonwoven web was heavier (0.6 oz/sq. yd.). The formed separator exhibited a total void volume of 58 percent, a morphology of very small pores at the surface which gradually developed into larger pores internally and the web was internal in the separator product. The separator showed an ER of 0.87 ohm-cm.

EXAMPLE III

A separator was formed in the same manner as described in Example I except that the polymer/filler solution was formed from a mixture of 8 parts polyarylether sulfone, 2 parts fumed silica (DeGussa A-200), and 90 parts N-methylpyrrolidone. The solution's viscosity was $5.0 \times 10^3$ cps (Brookfield, #3 spindle, 12 rpm). The solution was applied to a 0.75 oz/sq. yd. polyester nonwoven web. The product had a thickness of about 5 mils and a void volume of 70 per cent. The resultant separator product had an ER of 1.2 ohm-cm.

In all of the above Examples, the sheet product exhibited good flexibility and very low electrical resistance. The product did not exhibit flaking or disintegration of the product which is conventionally observed with highly filled polymeric membranes.

EXAMPLE IV

A solution was prepared by mixing 4.7 parts of a polycarbonate (MW=30,000) formed from Bisphenol-A and phosgene (Lexan 181), 4.7 parts precipitated silica (Davison, Sylox-2 average part. size=10 microns), 0.06 part 2,2-diethyldihexylamine, 0.15 part polyacrylic acid and 48.9 parts N-methylpyrrolidone using a high shear mixer (Myers). The solution had a viscosity of $7.15 \times 10^3$ cps (Brookfield viscometer with #3 spindle).

A 0.5 oz/yd$^2$ nonwoven polyester fabric (denier=2.2) was saturated with the solution by passing the fabric over one roller of a pair of reverse kiss rollers to which the solution was introduced. The solution was thus forced through the fabric with removal of air and resulted in a saturated material having excess solution on both major surfaces. The saturated fabric was then caused to travel in s substantially vertical direction while passing through a set of gapping bars to provide a saturated material of about 7 mils thick. The material then entered a first aqueous bath and remained therein for about 30 seconds to allow solidification of the polymer and extraction of a portion of the organics. The material was then subjected to a series of aqueous baths composed of fresh D.I. water at 50° C. for further removal of organics. The formed material was air dried at 60° C. for 3 min. The material was analyzed for residual organic (NMP) by dissolving a sample in THF and analyzing using gas phase chromatography and was found to contain less than 1 wt. percent NMP based on the dried weight of the formed material. The morphology was analyzed using scanning electron microscopy (SEM) and showed that the pores at the surface of the formed sheet were less than 0.3 microns in diameter while pores at the center of the material's thickness were about 5 microns with some smaller pores in the range of 2 to 5 microns in diameter. The total void volume was determined by difference between the weight of dried sample and after saturation with isopropanol and was found to be 77%. The electrical resistance of 0.94 ohm-cm. was determined.

EXAMPLE V

A separator product was formed in the same manner as described in Example IV, above, except that the polymer/filler solution was formed from 48 parts polycarbonate, 48 parts precipitated silica, 0.5 part DEDHA, 1.5 parts polyacrylic acid and 504 parts N-methylpyrrolidone (NMP). The solution had a viscosity of $8.35 \times 10^3$ cps. The nonwoven web was heavier (0.6 oz/sq.yd.) than used in Ex. IV. The formed separator exhibited a total void volume of 78 percent, a morphology of very small pores at the surface with gradually larger pores internally and the web was internal in the separator product. The separator showed an ER of 0.8 ohm-cm.

EXAMPLE VI

A solution was prepared by mixing 80 parts of polyvinyl chloride (Geon-30), a high pH (pH of 8.5) precipitated silica (Davison, Sylox-2) having an average particle size of 10 microns with particles ranging from 2 to 100 microns, 2.5 parts polyacrylic acid, 12 parts of a polyester (Paraplex G-25) as plasticizer for the polyvinyl chloride and 840 parts N-methylpyrrolidone using a high shear mixer (Myers). The solution had a viscosity of $1.03 \times 10^3$ cps (Brookfield viscometer with #3 spindle at 12 rpm). A 0.5 oz/yd² nonwoven polyester fabric (fiber denier 2.2) was saturated with the solution by passing the fabric through slot of a trough which contained the polymer/filler solution.

The solution was thus forced through the fabric with removal of air and resulted in a saturated material having excess solution on both major surfaces. The saturated fabric as it left the slot had a thickness of 8 mils. The saturated material was caused to travel vertically until it entered a first aqueous bath and remained therein for about 30 seconds to allow solidification of the polymer and extraction of a portion of the organics. The material was then subjected to a series of aqueous baths composed of fresh D.I. water at 50° C. for further removal of organics. The formed material was air dried at 60° C. for 3 min. The material was analyzed for residual organic (NMP) by dissolving a sample in THF and analyzing using gas phase chromatography. The material contained less than 1% NMP by weight based on the dry weight of the membranes. The morphology was analyzed using scanning electron microscopy (SEM) and the porosity was determined to have very small pores (up to about 0.3 microns) at the membrane surface with gradual increase to large pores of from 2 to 5 microns at the internal center portion of the membrane's thickness. The total void volume of 73% was determined by difference between the weight of dried sample and after saturation with isopropanol. The electrical resistance of 2.3 ohm-cm. was determined.

EXAMPLE VII

A separator product was formed in the same manner as described in Example I above except that the polymer/filler/solution was formed from 80 parts of a post chlorinated polyvinyl chloride (Temp Rite 666×512), 80 parts of acid neutralized precipitated silica (Sylox-2) (pH of 7) having an average particle size of 10 microns and a particle range of from 2 to 100 microns, 2.5 parts polyacrylic acid, 1 part diethyldihexylamine, 1 part of a polyester as plasticizer and 840 parts -methylpyrrolidone. The solution had a viscosity of $5.01 \times 10^3$ cps. The saturated fabric had a thickness of 8 mils. The formed separator exhibited a total void volume of 67 percent, a morphology of very small pores (up to 0.3 microns) at the surface with larger pores (2 to 5 microns) internally and the web was internal in the separator product. The separator had an ER of 1.1 ohm-cm.

EXAMPLE VIII

Separators were formed by initially forming polymer/filler dope solutions having compositions indicated in Table II below. Non-woven webs were saturated with the formed solution by passing the web over one roller of a pair of reverse kiss rollers to which the solution was introduced. The solution was forced through the web with removal of air to provide a saturated material having excess solution on both major surfaces. The saturated fabric was then caused to travel in a substantially vertical direction while passing through a set of gapping bars to provide a saturated material of about 7 to about 11 mils thick. The material then entered a first aqueous bath and remained therein for the time indicated below to allow solidification of the polymer and extraction of a portion of the organics. The material was then subjected to a second aqueous bath composed of fresh D.I. water at 50° C. for further removal of organics. The formed material was air dried at 60° C. for 3 min. The material was analyzed for residual organic (NMP) by dissolving a sample in THF and analyzing using gas phase chromatography. The morphology was analyzed using scanning electron microscopy (SEM). The total void volume was determined by difference between the weight of dried sample and after saturation with isopropanol. The electrical resistance was determined by the direct current method.

EXAMPLE IX

A solution was prepared by mixing 120 parts of a thermoplastic, high molecular wt. (about 2 million) polyurethane which is substantially free of polyester and polyether polyols of low functionality (Dow; Isoplast 301), 150 parts precipitated and neutralized (pH=7) silica (Davison, Sylox-2) having an average particle size of 10 microns with particle size range of from 0.2 to 100 microns, 15 parts of diionized water and 1215 parts N-methylpyrrolidone using a high shear mixer (Myers). The solution had a viscosity of 5.33×10 cps (Brookfield viscometer with #3 spindle).

A 0.5 oz/yds$^2$ nonwoven polyester fabric (denier of 2.2) was saturated with the above formed solution by passing the free fabric through a slot of a trough which contained the solution. The solution was thus forced through the web replacing the air to form a bubble free saturated web of 8 mils thickness. The saturated web traveled vertically from the slot to a water bath where it remained for about 30 seconds before contact with directional rollers. The polymer solidified and a portion of the organics (NMP) was removed by the aqueous bath. The material was then subjected to a second aqueous bath composed of fresh D.I. water at 50° C. for further removal of organics. The formed material was air dried at 60° C. for 3 min. The material was analyzed for residual organic (NMP) by dissolving a sample in THF and analyzing using gas phase chromatography and was shown to have less than 1 percent NMP based on the dry wt. of formed membrane. The morphology, analyzed using scanning electron microscopy, showed many very small pores (0.3 or less) on the membrane surface and gradual increase to about 5 microns at the interior center of the membrane. The total void volume of 76 percent was determined by difference between the weight of dried sample and after saturation with isopropanol. The electrical resistance of 1.2 ohm-cm. was determined by the direct current method.

EXAMPLE X

A sheet product was formed by a dual application method in which a low viscosity dope was first applied to a non-woven polyester fibrous sheet (0.75 oz/yd$^2$) and subsequently a high viscosity dope was applied.

High viscosity dope was prepared by dispersing 1 part of precipitated silica (Sylox-2) and 1 part polyarylether sulfone (Amaco-Udel P-1700) in 7.3 parts N-methyl pyrollidone (NMP) using a high speed disperser/mixer. While maintaining the mixture at less than 30° C., 0.03 part of di(2-ethylhexyl)amine (DEHA) in 2.6 part NMP are mixed in at low speed followed by 0.03 part of a polyacrylic acid of MW$_w$=4,000,000 (Carbopol 940) in 1.9 parts NMP. The resultant mixture has a high viscosity of 3300 cps (Brookfield, #4 at 50 rpm).

Low viscosity dope was prepared in similar manner to above except the ratio components were: 1 part silica: 8.31 parts of polymer (12.7% in NMP); 0.015 part DEHA; 1.2 parts polyacrylic acid 940 (1.6% in NMP); and 3.18 parts NMP. The final viscosity was 950 cps (same Brookfield conditions).

A 9 inch wide polyester non-woven sheet (Reemay 2275, Reemay, Inc.) was saturated by passing continuously through a bath of 950 cP saturation solution, excess swept off using a Delrin bar riding on top of saturated web, and coated with 3300 cP solution using a knife blade set 14 mil over a stainless steel smooth surface. The dual coated fabric was directed 45 degrees off of the plate and into a water coagulation bath (<35% N-methyl pyrrolidone in water) at a speed between 3 and 8 feet per minute. The coagulated material was completely formed within 10 seconds of immersion, based on solvent exchange in the room temperature bath. The residence time in this bath was about 90 seconds. The product was then passed through a D.I. water rinse bath (residence time of 120 seconds), with continuous bath recycling, a spray wash zone (2 gpm water spray) and take up. The roll of membrane was dried on a steam drum at 80° to 95° C. The product is 7.5-8.5 mil thick, has a porosity from 70 to 73%, shows a maximum pore size of 0.7 to 1.5 micron, an average pore size of 0.1 to 0.12 micron, and has an electrical resistance of 3.5 to 4.5 mohn-in$^2$.

EXAMPLE XI

A separator was prepared in a similar manner as described in Example X except that the silica was omitted and an increased amount of Carbopol was added. A high viscosity solution was prepared by adding 9 parts of polymer (P-1700) to 52.5 parts of N-methyl pyrrolidone followed by addition of 1 part of D(EH)A. 37.5 parts of a dispersion of polyacrylic acid having a mol. weight (wt. avg.) of about 3,000,000 (Carbopol 934) in N-methyl pyrrolidone (2.0% by weight) was blended into the polymer solution using a high speed laboratory disperser/mixer at a temperature of 30° C. and speed of 4000 rpm. The solution had a final viscosity of 2900 cP (Brookfield, #4 spindle, 50 rpm). Similarly, a low viscosity solution was prepared using the following ratios: 8 parts of polymer (P-1700), 79.0 parts of NMP, 12.5 parts of 2.0% Carbopol 934 in NMP, and 0.5 parts of D(EH)A. The final solution viscosity was 550 cP (Brookfield, #4, 50 rpm).

The dual application was applied in a similar manner as Example X to make two different separator products by coating a non-woven polyester continuous filament web of 0.75 oz/yd$^2$ (Reemay 2275) and by coating a non-woven polyester tri-lobal continous filament web of 1 oz/yd$^2$ (Reemay 2014). They were coated using a final casting thickness of 10 mil and 13 mil, respectively. Washing was done in the same manner as above but drying was performed using a floatation air dryer. The separators had the following characteristics.

| Support | Thickness (mil) | Porosity (%) | Pore Size Dist. (microns) | | ER (mohm-in$_2$) |
|---|---|---|---|---|---|
| | | | Max | Average | |
| 2275 | 6.0 | 70.0 | 0.60 | 0.50 | 2.5 |
| 2014 | 7.3 | 71.2 | 1.8 | .60 | 5.5 |

EXAMPLE XII

A separator useful for alkaline battery system was prepared from an unfilled sheet product- The sheet product was achieved by initially mixing 1 part polyarylether sulfone (Amaco-Udel P-1700) in 9.0 parts of N-methyl pyrollidone (NMP) using a high speed disperser/mixer- While maintaining the mixture at less than 30° C., 5 parts of a polyacrylic acid of MW$_w$=4,000,000 (Carbopol 940) in NMP as 1% solution was added to the mixer followed by 10 parts of 2,2-diethyldihexylamine. The resultant mixture had a viscosity of 150 cps (Brookfield viscometer with #3 spindle at 12 rpn).

The resultant solution was degassed by subjecting it to a partial vacuum for 2 hours. A 0.6 oz/yd$^2$ polypropylene non-woven fiber sheet which was corona treated (Reemey T-159) was saturated with the solution by passing the fabric over one roller of a pair of reverse kiss rollers to which the solution was introduced. The solution was thus forced through the fabric with removal of air and resulted in a saturated material having excess solution on both major surfaces. The saturated fabric was then caused to travel in a substantially vertical direction while passing through a set of gapping bars to provide a saturated material of about 9 to 10 mils thick. The material then entered a first aqueous bath which has an NMP concentration between 35 to 38% at 25°–30° C. to allow solidification of the polymer and extraction of a portion of the organics. The material was then subjected to a second aqueous bath composed of fresh D.I. water at 25°–27° C. for further removal of organics. The formed material was air dried at 60° C. for 3 min. The material was analyzed for residual organic (NMP) by dissolving a sample in THF and analyzing using gas phase chromatography. The material was free of organic NMP. The morphology was analyzed using scanning electron microscopy (SEM). The maximum pore diameter was 8.1 μm and the average pore diameter was 0.35 μm. The electrical resistance was measured as 8.2 ohm-cm. The pores had increasing pore diameter from each surface to the center.

EXAMPLE XIII

A separator useful for alkaline battery systems was produced in a similar manner to that described in Example XII above except that the dope was formed from a mixture of 8.4 parts NMP, 0.8 part polysulfone (Udel P-1700), 0.8 part powder $TiO_2$, 5 parts Carbopol 940 and 10 parts of 2,2-diethyldihexylamine. The viscosity of the resultant dope was 150 cps (Brookfield viscometer with #3 spindle at 12 rpm).

The sheet product was formed in the same manner as described in Example VI. The resultant sheet product had a thickness of about 9.5 mil., a maximum pore diameter of 12.5 μm and an average pore diameter of 5.0 μm. The pore diameter of the pores increased from each surface to the center of the sheet. The electrical resistance of the sheet product was 6.4 ohm-cm.

What is claimed:

1. A battery separator comprising a microporous sheet product having a thickness of less than about 50 mils bound by first and second surfaces of the sheet product, comprising a mixture of from 1:4 to 4:1 wt. ratio of a polymer and a filler with a porous sheet having a thickness which is substantially embedded between the first and second major surfaces of the sheet product, and having porosity throughout the sheet product's thickness with a pore size distribution such that the pore size increases from each surface towards an interior, central portion of the sheet product's thickness.

2. The battery separator of claim 1 wherein the pore size distribution is continuous in increase of pore size from each surface to the interior, central portion of the sheet product's thickness.

3. The battery separator of claim 1 wherein the pore size of the sheet product is less than about 10 microns, the pore size of the pores in the immediate proximity to each of the first and second surfaces is equal and less than about 3 microns and the pore size distribution is continuous in increase of pore size from each surface to the interior, central portion of the sheet product's thickness.

4. The battery separator of claim 1 wherein the ratio of porous sheet thickness to separator sheet product thickness is up to about 0.8; said porous sheet is a woven, non-woven or knit material formed from 0.02 to 10 denier fiber, is formed from fibers selected from the group consisting of polyesters, polyolefins, polynitriles and glass and has a tensile strength of at least 5 p.l.i.

5. The battery separator of claim 4 wherein the polymer is selected from the group consisting of a polysulfone, polycarbonate, polyurethane, or polyhalogenated olefin.

6. The battery separator of claim 4 wherein the filler is selected from an inert inorganic particulate, said particulate having surface area of from about 20 to 950 $m^2/gm$, a pore volume of at least 0.22 cc/gm, an average particle size of from about 0.01 to 75 microns and is free of particles having particle size larger than 100 microns.

7. The battery separator of claim 6 wherein the particulate is silica.

8. The battery separator of claim 6 wherein the particulate is selected from the group consisting of oxides and hydroxides of calcium, magnesium, titanium, aluminum and mixtures thereof.

9. A battery separator comprising a microporous sheet product having a thickness of less than about 50 mils bound by first and second surfaces of the sheet product, comprising a mixture of a polymer and from about 0.1 to 15 weight percent based on the polymer of a structure enhancing agent with a porous sheet having a thickness which is substantially embedded between the first and second surfaces of the sheet product, and having porosity throughout the sheet product's thickness with a pore size distribution such that the pore size increases from each surface towards an interior, central portion of the sheet product's thickness.

10. The battery separator of claim 9 wherein the polymer is selected from the group consisting of a polysulfone, polycarbonate, polyurethane, and polyhalogenated olefin.

11. The battery separator of claim 9 or 10 wherein the agent is selected from the group consisting of a polycarboxylic acid polymer salt and a polysulfonic acid polymer salt formed with 0.25 to 1.01 molar equivalent of base selected from the group consisting of alkali metal, alkaline earth metal a secondary amine and a tertiary amine.

12. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 1, 2, 3, 4, 5, 6, 7, 8, 9, or 10.

13. In a battery having at least one pair of electrodes of opposite polarity, an electrolytic composition and a separator positioned between adjacent electrodes of opposite polarity, wherein the improvement comprises that the separator extends at least the length and breadth of the electrodes and comprises the product of claim 11.

* * * * *